United States Patent [19]

Maruyama et al.

[11] Patent Number: 5,583,884
[45] Date of Patent: Dec. 10, 1996

[54] SPREAD SPECTRUM MODULATION AND DEMODULATION SYSTEMS WHICH ACCELERATE DATA RATE WITHOUT INCREASING MULTILEVEL INDEXING OF PRIMARY MODULATION

[75] Inventors: Hidenori Maruyama; Hideho Tomita, both of Tokyo, Japan

[73] Assignee: NEC Corporation, Tokyo, Japan

[21] Appl. No.: 357,732

[22] Filed: Dec. 16, 1994

[30] Foreign Application Priority Data

Dec. 16, 1993 [JP] Japan ................................ 5-316161

[51] Int. Cl.$^6$ .................................................. H04B 15/00
[52] U.S. Cl. ........................... 375/207; 380/48; 375/200; 370/107
[58] Field of Search ....................... 375/206, 377, 375/200, 413, 207, 208, 209, 210, 367, 261, 362, 264, 298; 370/18, 107, 19, 21; 327/164; 342/82, 89; 380/12, 48, 9

[56] References Cited

U.S. PATENT DOCUMENTS

| | | | |
|---|---|---|---|
| 4,774,715 | 9/1988 | Messenger | 375/208 |
| 4,894,842 | 1/1990 | Broekhoven et al. | 375/206 |
| 5,144,641 | 9/1992 | Akazawa et al. | 375/208 |
| 5,285,472 | 2/1994 | Leonard et al. | 375/208 |
| 5,291,515 | 3/1994 | Uchida et al. | 375/200 |
| 5,293,398 | 3/1994 | Hamao et al. | 375/207 |

Primary Examiner—Wellington Chin
Assistant Examiner—William Luther
Attorney, Agent, or Firm—Sughrue, Mion, Zinn, Macpeak & Seas

[57] ABSTRACT

The present invention is an art of spread spectrum modulation systems, wherein a binary serial data is divided into a first bit data and a second bit data, the first bit data is primarily modulated, a spread code corresponding to the second bit data is selected, and the modulated data is spread by multiplying the primarily modulated first bit data by the selected spread code. In reception side, the spread code used for spreading in transmitter is detected in correlator, the second bit data is specified and the first bit data is demodulated.

52 Claims, 4 Drawing Sheets

SPREAD SPECTRUM MODULATION AND DEMODULATION SYSTEMS WHICH ACCELERATE DATA RATE WITHOUT INCREASING MULTILEVEL INDEXING OF PRIMARY MODULATION

BACKGROUND OF THE INVENTION

1. Field of the Invention

This invention relates to a spread spectrum communication system containing a modulator and a demodulator.

2. Description of the Prior Art

Spectrum spread systems are widely used for a local communicating means, such as wireless local area networks (LAN), communications with a weak electric wave, and the like.

Spread spectrum communication systems have a variety of systems such as a direct spread (DS) system, a frequency hopping (FH) system, or a combined type of the above two systems.

In the DS system, when an information signal is a(t), an output of a primary modulator is b(t), and a spread code is c(t), a spread-modulated signal s(t) is defined by $$s(t)=b(t) \times c(t).$$

If the data rate of the information signal a(t) is Ra (bit/sec), the symbol rate of the primarily modulated signal b(t) is Rb (symbol/sec), and the chip rate of the spread-modulated signal s(t) is Rc (chip/sec), a bandwidth W(Hz) of the spread-modulated signal s(t) after being spectrum-spread, a spectral spread ratio K and a multilevel index m (an index representing phase shifting quantity) of the primary modulator (here, m=n) are defined respectively as follows;

$$W=2Rc$$

$$K=Rc/Rb$$

$$Ra=mRb.$$

Accordingly, the data rate Ra of the information signal is shown by $$Ra=mW/2K.$$

From the above equation, it is found that the larger a value of m is set, the more the data rate of the information signal (Ra) is accelerated.

Primary modulation used in the conventional DS spread spectrum system has usually employed Quaternary Phase-Shift Keying (hereinafter, referred to as QPSK) (m=2), and to increase the multilevel index, 8PSK (Phase-Shift Keying) (m=3) or 16PSK (m=4) has been developed, for example.

Actually, the data rate of the 8PSK (or 16PSK is 1.5 to 2 times faster than that of QPSK, but the phase between signals in the 8PSK and 16PSK are $\pi/8$ and $\pi/16$ respectively, while the phase between signals in QPSK shows $\pi/4$. Such decrease in the phase naturally brings about shortening the interval of signals, causing deterioration of the bit error rate in proportion to the multilevel index m under the same signal-to-noise condition.

Therefore, in case of increasing multilevel index in PSK, it is absolutely necessary to employ error correction coding, etc., which will decrease data rate of the information signal by the duration spent for its encoding rate.

SUMMARY OF THE INVENTION

It is an object of the present invention to provide a system enabling to accelerate the data rate without increasing multilevel index of primary modulation.

The object of the present invention is achieved by a spread spectrum communication system comprising: a step of converting a binary serial data to n parallel bit data; a step of primarily modulating m parallel bit data in said n parallel bit data; a step of selecting a spread code corresponding to (n−m) parallel bit data that were not primarily modulated from among $2^{(n-m)}$ kinds of preset spread codes; a step of spread modulation of multiplying m parallel bit data that were primarily modulated by the selected spread code, and transmitting modulated signals; a step of receiving said modulated signals, converting said modulated signals to digital data and holding the data bit by bit and in order of input; a step of latching the data held in order of input by parallel sending them at synchronous point and sequentially multiplying bit by bit the latched data by said $2^{(n-m)}$ kinds of spread codes; a step of detecting a maximum value from among correlation values obtained by the multiplications; a step of detecting a spread code corresponding to said maximum value and specifying a spread code used for spreading; a step of determining (n−m) bit data based on a specified spread code and demodulating m bit data based on a maximum correlation value; and a step of converting the determined (n−m) bit data and the demodulated m bit data to said binary serial data.

The present invention configured as above enables to accelerate the data rate without increasing multilevel index of information modulation through the steps of converting an information signal consisting of a binary serial data to n parallel bit data, primarily modulating m parallel bit data in the n parallel bit data, generating respective spread codes corresponding to the rest (n−m) data, multiplying the primarily modulated m bit data by the spread codes to conduct spread spectrum modulation, transmitting the data conducted by spread spectrum modulation, Moreover, the receiver of the present invention receives the transmitted data, converts received data to digital data, holds them bit by bit and in order of input, latches the data held in order of input by parallel sending at synchronous point, bit by bit and sequentially multiplies the latched data by at most $2^{(n-m)}$ spread codes used for the above-mentioned spread spectrum modulation, detects a maximum correlation value obtained by the multiplication, determines (n−m) bit data based on a spread code giving the maximum value and obtains m bit data by demodulating correlation values obtained by the above multiplications.

As described above, even in QPSK modulation where m=2, the present invention shows excellent effects like that the data rate is raised to n/2 times than before, accelerating of data rate is possible without increasing multilevel index, some problems such as error rate deterioration caused by multilevel information modulation or increasing manufacturing cost of the radio section caused by securing linearity.

Furthermore, the present invention shows an effect that circuit configuration thereof can be simplified, because it enables to efficiently demodulate transmitted signals of which data rate is accelerated and it does not need to prepare matched filters for correlation detection for respective spread codes.

This and other objects, features and advantages of the present invention will become more apparent upon a reading of the following detailed description and drawings.

DESCRIPTION OF THE PREFERRED EMBODIMENTS

First, the first embodiment of the invention is explained.

Figure 1:
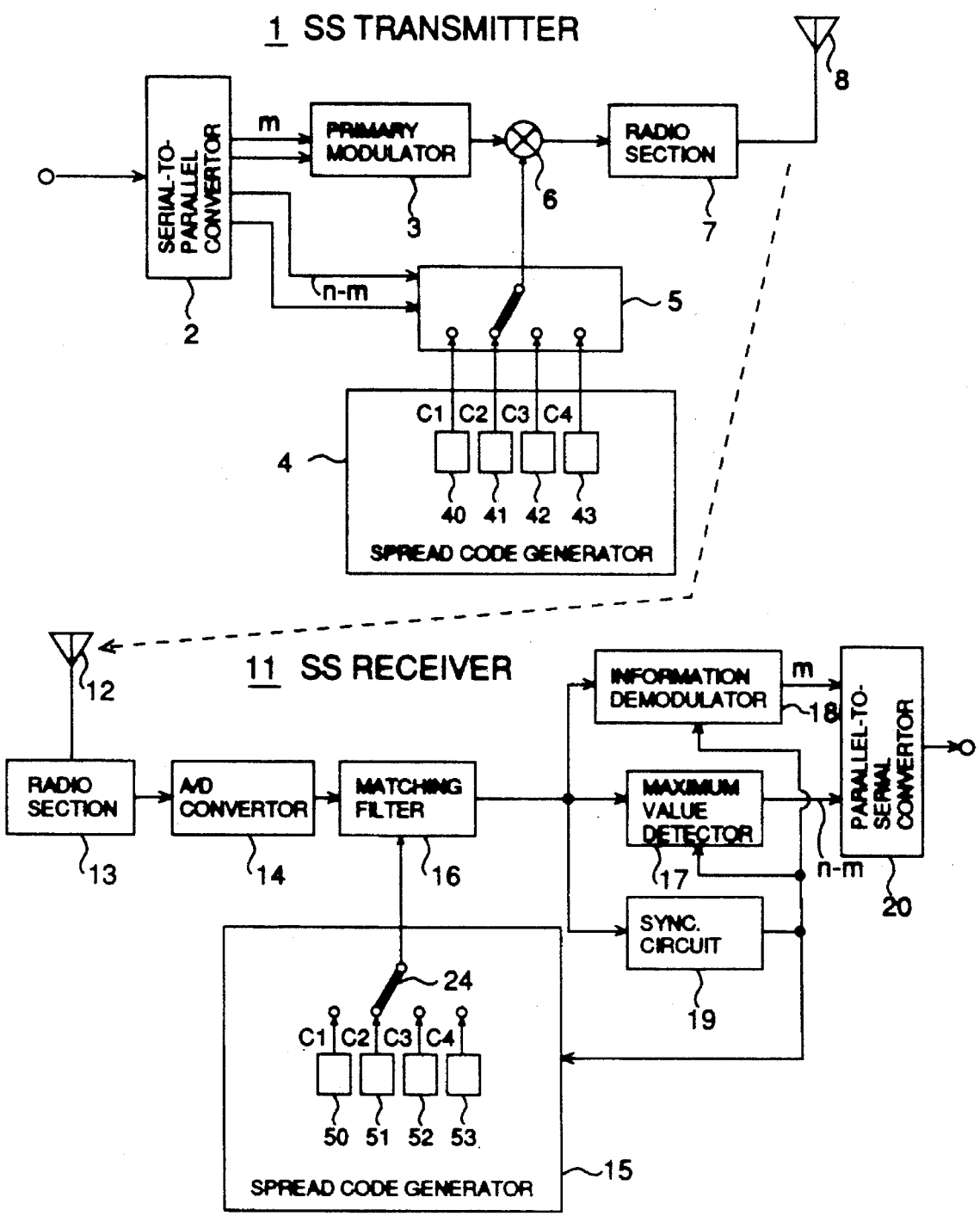
FIG. 1 is a block diagram of the first embodiment of the present invention.

FIG. 1 is a block diagram illustrating an SS transmitter with a modulator of the present invention and an SS receiver with a demodulator.

Figure 2:
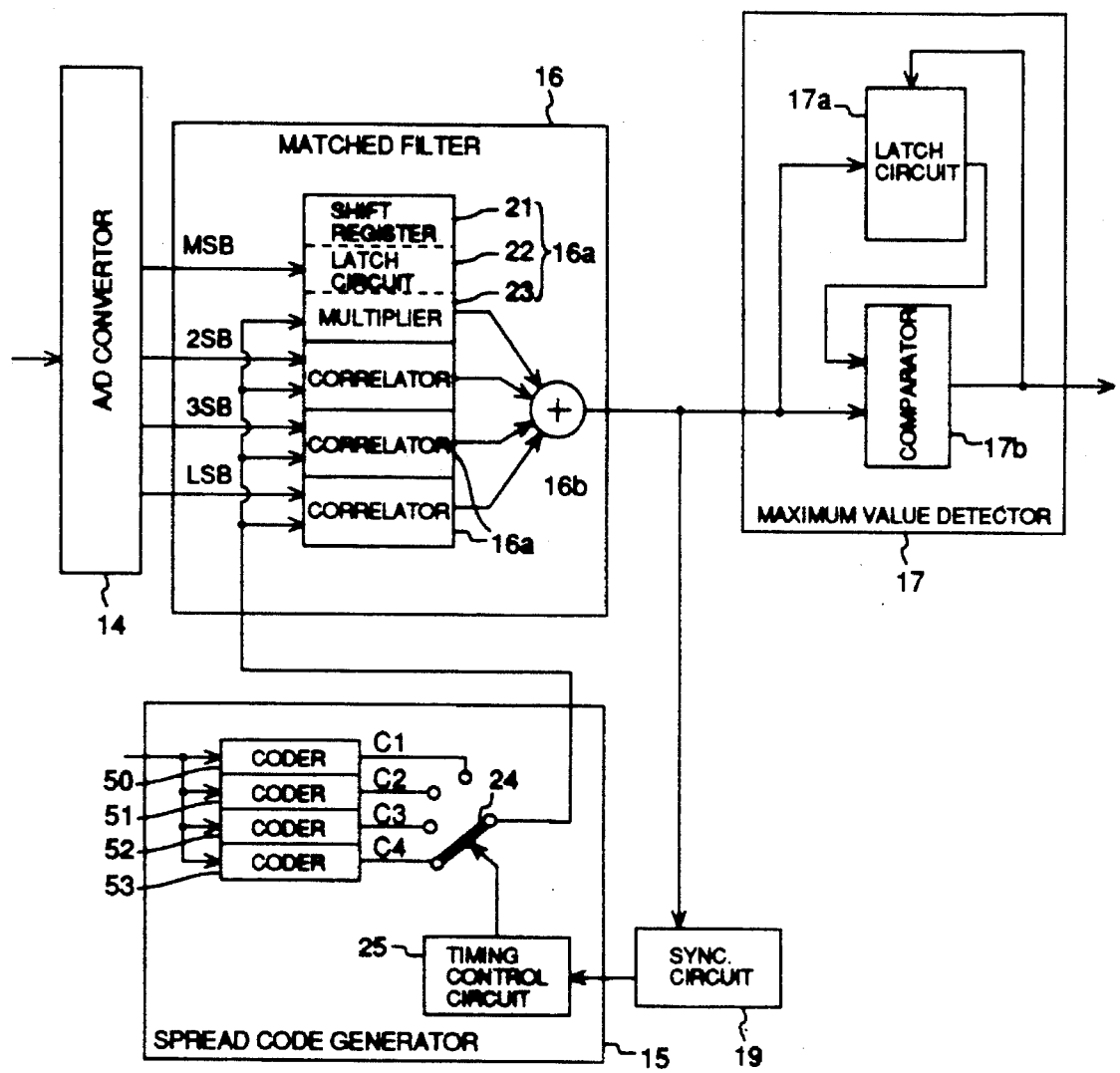
FIG. 2 is a schematic diagram of a circuit of the SS receiver in FIG. 1.

FIG. 2 is a block diagram of a circuit of the SS transmitter in FIG. 1.

Figure 3:
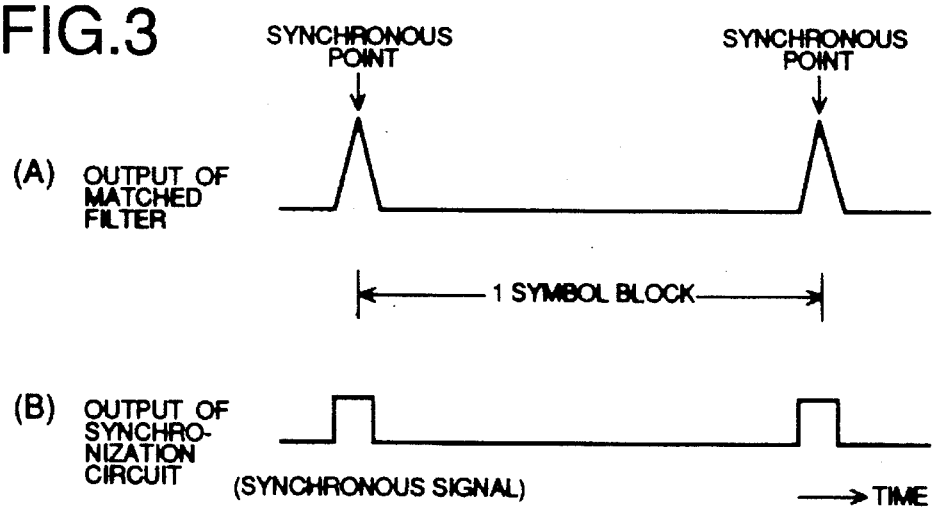
FIG. 3 is a group of waveform diagrams at some parts of the SS receiver in FIG. 1.

FIG. 3 is a group of waveform diagrams at some parts of the SS receiver in FIG. 1.

Referring to FIG. 1, the SS transmitter 1 comprises a serial to parallel converter 2 for converting an n bit serial data bit by bit into n parallel bit data, a primary modulator 3 for primarily modulating m parallel bit data in the n parallel bit data from the serial to parallel converter 2, a spread code generator 4 for generating spread codes, a spread code selector 5 for selecting one spread code from among the spread codes in accordance with the (n−m) parallel bits that were not provided to the primary modulator 3, a multiplier 6 for the output of the primary modulator 3 by the one spread code selected by the spread code selector 5, a radio section 7 for modulating the output of the multiplier 6 for on air, and an antenna 8 radiating the output of the radio section 7.

Next, the further details about the transmitter is explained, assuming that n is 4 and QPSK is used for primary modulation (m=2), for the sake of simplicity.

The information signal that is a binary serial data is converted to four parallel bit data b1, b2, b3 and b4 with the parallel converter 2. Out of the four parallel bit data, the two parallel bit data b1 and b2 are modulated by QPSK at the primary modulator 3.

Whereas, the rest of the parallel bit data, b3 and b4 are applied for selecting one of the four spread codes C1 to C4 generated with the spread code generator 4. The code selector 5 selects one of the four codes 40 to 43 in the spread code generator 4 in response to the four combinations of the b3 and b4, namely 00, 01, 10, and 11.

The output of the primary modulator 3 is sent to the multiplier 6, then multiplied by a spread code generated by one of the coders 40 to 43 selected by the spread code selector 5.

The spread spectrum output from the multiplier 6 is RF-modulated with the radio section 7, which is then radiated from the antenna 8.

Incidentally, if the data rate of the information signal a(t) is Ra (bit/sec), the symbol rate of the primarily modulated signal b(t) is Rb (symbol/sec), and the chip rate of the spread-modulated signals s(t) is Rc (chip/sec), the bandwidth W (Hz) of the spread-modulated signal s(t), the spectral spread ratio K and the multilevel index m at the primary modulator 3 are defined by $$W=2Rc,\ K=Rc/Rb,\ Ra=mRb+(n-m)Rb=nRb.$$

Thus, the data rate Ra of the information signal is shown by $$Ra=nW/2K.$$

Here, if n=4 and m=2, Ra is 2W/K. Therefore, comparing this SS transmitter 1 of the present invention with a conventional SS transmitter under the conditions that the spread bandwidth W and the spectral spread rate K are the same, it is found that the data rate of the information signals of the SS transmitter 1 is two times faster than that of a conventional SS transmitter that simply spectrum spreads QPSK modulated signals.

For accelerating the data rate more, by setting n=6 the data rate becomes three times as fast as the prior art, leaving the primary modulation QPSK(m=2) as it is. If setting n=8, the data rate becomes four times as fast as the prior art. That is, by setting the conversion rate n in the parallel-to-serial convertor 2 bigger, the data rate becomes n/2 times as fast as the prior art. However, as accelerating the data rate, also the number of spread codes to be used must be increased to $2^{n-m}$ pieces. But, this method enables to continue to use QPSK as it is, it is possible to avoid the problems such as deterioration of bit error rate.

Next, an SS receiver 11 that receives and demodulates radio signals transmitted from the above-mentioned SS transmitter 1 is explained.

The SS receiver 11 comprises a radio section 13 for extracting baseband signals from RF signals included in waves caught with an antenna 12, an analog-to-digital convertor (A/D convertor) 14 for converting outputs of the radio section 13 to digital data, a spread code generator 15 for generating four kinds of spread codes, a matched filter 16 for multiplying outputs of the A/D convertor 14 by the spread codes to calculate correlation values, a maximum value detectors 17, an information demodulator 18 and a synchronization circuit 19 that are connected in parallel with a matched filter 16, a parallel-to-serial convertor 20 for converting, in group, outputs of the information demodulator 18 and the synchronization circuit 19 to serial data.

As shown in FIG. 2, the matched filter 16 comprises four correlators 16a's provided for each bit from MSB (most significant bit) to LSB (least significant bit) of 4 bit output of the A/D convertor 14, and an adder 16b for adding absolute values of outputs of the correlator 16a's. Each correlator 16a comprises a shift register 21 for holding, bit by bit and in order of input, outputs of the A/D convertor 14, and a latch circuit 22 for latching data held in order of input with the shift register 21 at synchronous point by parallel transmitting them, and a multiplier 23 for multiplying bit by bit the data latched with the latch circuit 22 by parallel outputs of the spread code generator 15.

The spread code generator 15 has coders 50 to 53 for generating four kinds of spread codes C1 to C4 used for spread spectrum modulation in its body. Outputs of four coders 50 to 53 are sequentially supplied to the correlator 16a's in the matched filter 16 through the switch 24.

25 is a timing circuit for receiving synchronous outputs of a synchronization circuit 19 and operating the switch 24.

A maximum value detector 17 detects a maximum value in correlation values obtained from the matched filter 16. It comprises a latch circuit 17 for latching a maximum value obtained by comparison of correlation values and comparator 17b for comparing the output of the latch circuit 17a with the second largest correlation value. And it specifies the spread code used for modulation based on the maximum value and specifies n–m bits of transmitted data, that is, the bits b3 and b4 in this embodiment, based on the spread code.

The maximum value is demodulated in the information demodulator 18. In this embodiment, m bits data that were QPSK modulated by the SS transmitter 1, that is, the bits b1 and b2 are QPSK demodulated.

The bits b1 and b2 output from the information demodulator 18 and the bits b3 and b4 output from the maximum value detector 17 are converted to serial data consisting of bits b1 to b4 in the parallel-to-serial convertor 20.

Next, the concrete operations of the invention are explained.

First of all, waves radiated from the SS transmitter 1 is caught with the antenna 12 and converted from RF signals to baseband signals in the radio section 13, then converted to 4 bit digital data in the A/D convertor 14.

Outputs of the analog-to-digital convertor 14 are calculated correlation values by being multiplied in the matched filter 16 by any one of the spread codes C1 to C4 that were used for spread spectrum modulation in the transmitter. At this time, however, a certain knowledge is only that one of the spread codes C1 to C4 was used in the transmitter. Also, symbol timing for specifying a synchronous point is not determined yet.

By this reason, until initial synchronization is established, the system of this invention monitors outputs of the matched filter 16 to lock oscillation phase of a phase locked loop (PLL) output built in the synchronization circuit 19, adjusting the synchronous point where the output of the matched filter 16 becomes a maximum value.

After the phase is locked, as shown in FIG. 3(A) and FIG. 3(B), the synchronization circuit 19 continues synchronization tracking to generate synchronization signals in accordance with synchronous points.

In addition, if initial synchronization is established once by the synchronization circuit 19, synchronous signals synchronized with a symbol period can be obtained from the synchronization circuit 19. By this, the timing control circuit 25 that is triggered by this synchronous signal generates a timing signal of a chip cycle to sequentially switch the switch 24. At this time, four correlators 16a's within the matched filter 16 sequentially and respectively multiplies the data latched with the latch circuit 22 from the shift register 21 at a synchronous point by the spread codes C1 to C4 generated by the coders 50 to 53, so calculating correlation values with a different spread code in each one chip cycle past from a synchronous point at once. By this reason, a maximum correlation value is detected until 4 chip cycle has elapsed.

Like this, after the initial synchronization has been established, the above-mentioned SS receiver 11 is enough to multiply only the spread code at a synchronous point, so it may multiply spread codes C1 to C4 that are supplied sequentially by switched for correlation detection by only the data latched at the synchronous point.

Therefore, the receiver of the present invention enables to conduct correlation using all spread codes during one symbol time and obtain four parallel bit data, that is, b1, b2, b3 and b4 that are transmitted data by combining two bits b1 and b2 that are obtained by demodulating correlation value information and the other two bits b3 and b4 that are determined from bits 00, 01, 10 and 11 corresponding to the spread codes C1 to C4 giving a maximum correlation value.

By these operations, this receiver can effectively demodulate transmitted signals of accelerated data rate, furthermore, it does not need the matched filter 16 for detecting correlation for each spread code. Therefore, circuit configuration thereof is also simple.

Next, the second embodiment is explained.

Figure 4:
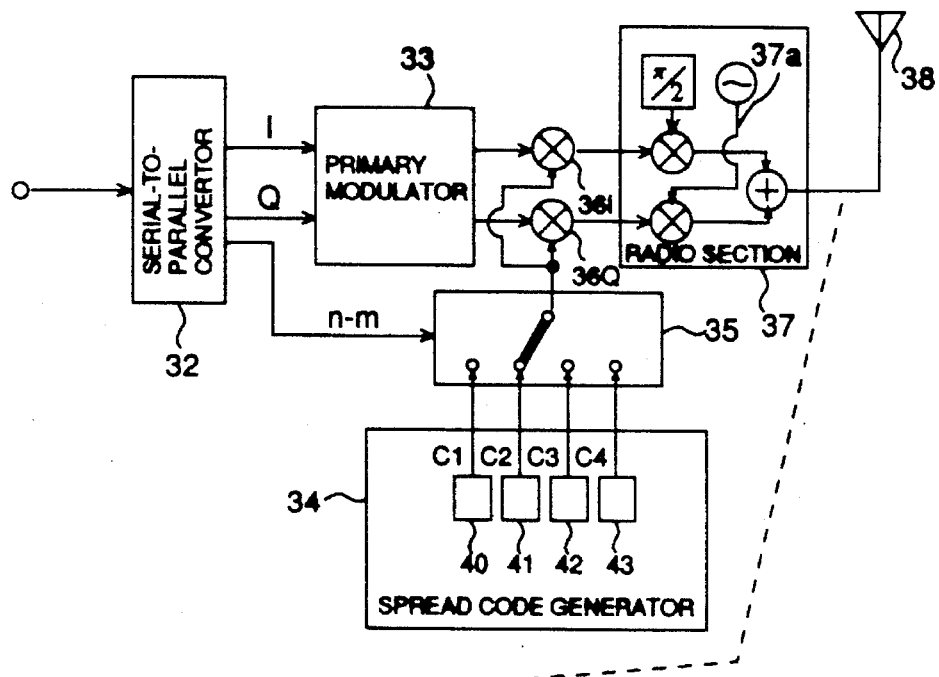
FIG. 4 is a block diagram of the second embodiment of the present invention.
Figure 4:
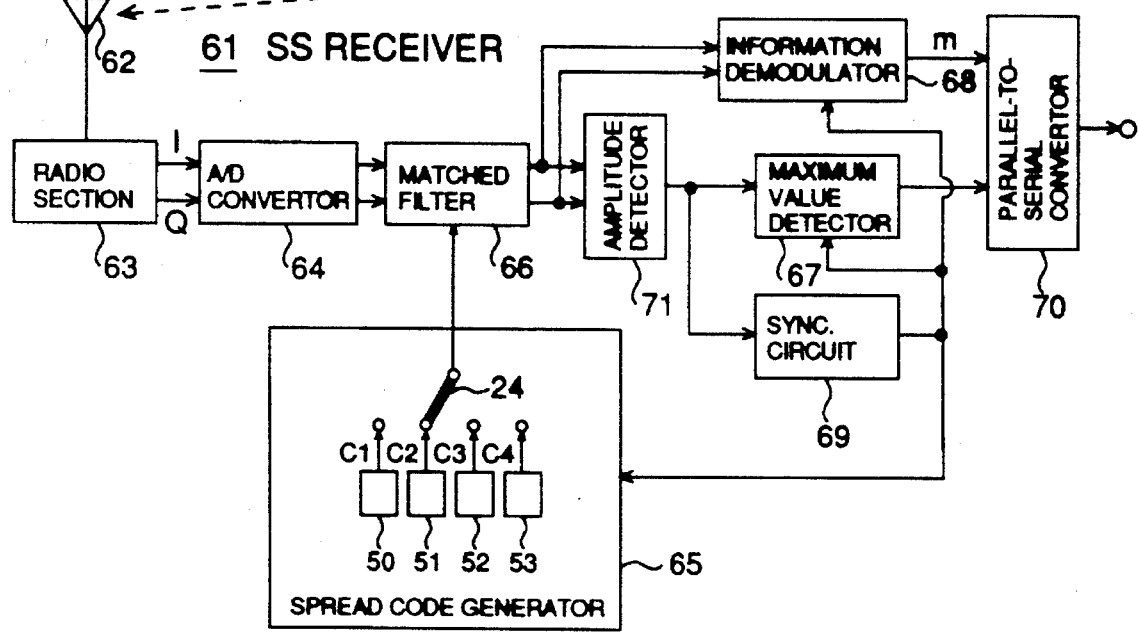

FIG. 4 is a block diagram showing the second embodiment.

In this second embodiment, m parallel bit data in n parallel bit data of the parallel-to-serial convertor 32 are primarily modulated respectively in the primary modulator 33, after being divided into in-phase components I and quadrature components Q. Then both components are spread in the multipliers 36I and 36Q.

34 is a spread code generator for commonly used by the multipliers 36I and 36Q, where the spread code selector 35 selects one of the coders 40 to 43 corresponding to (n–m) parallel bit data. The in-phase components I and the quadrature components Q, which were spread, are modulated in the quadrature modulator 37a in the radio section 37, and the modulated signals are radiated from the antenna 38.

On the other hand, an SS receiver 61 shown in FIG. 4 firstly converts quadrature components Q and in-phase components I that were modulated during coming through from the antenna 62 to radio section 63 to digital data in the A/D convertor 64, respectively.

Then, the outputs of the A/D convertor 64 are calculated in the matched filter 66 by multiplying one of the spread codes C1 to C4 generated by the spread code generator 65.

Figure 5:
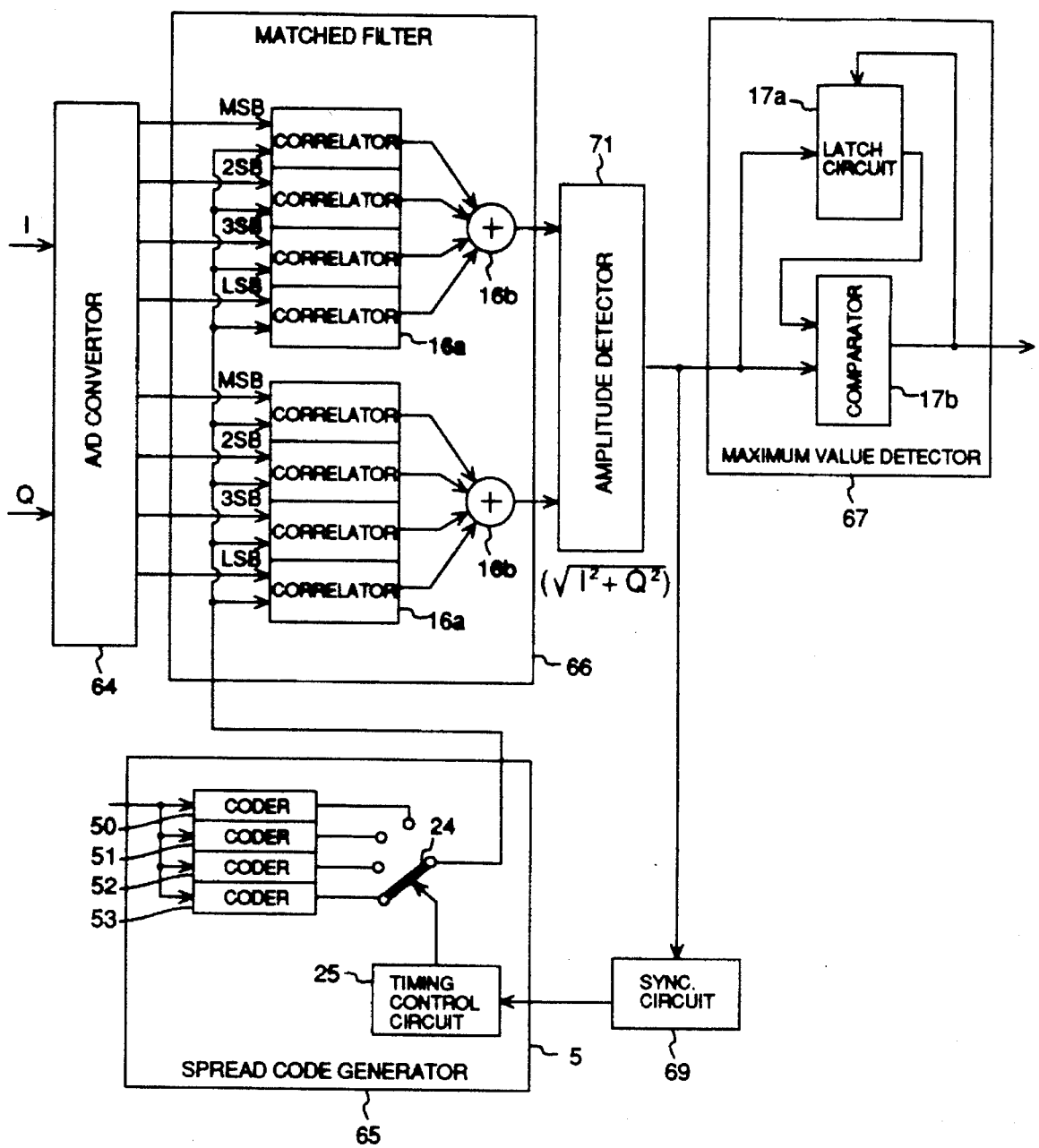
FIG. 5 is a schematic diagram of a circuit of the SS receiver in FIG. 4.

Before being supplied to the maximum value detector 67 or the synchronous circuit 69, the outputs of the matched filter 66 are calculated of its vector sum with the amplitude detector 71 shown in FIG. 5. That is, they are input to the maximum value detector 47 as a square root of square sum, finally output as four parallel bit data from the parallel-to-serial convertor 70.

It is to be noted that, it is possible to use respectively independent spread codes for the in-phase component I and quadrature component Q, although a common spread code is used for the in-phase component I and quadrature component Q in the above-mentioned embodiment. In this case, it is better to use u bits and v bits divided from (n–m) parallel bit data that are the rest of n parallel bit data after subtracting m parallel bit data that are primary modulated, for generating respective spread codes for in-phase component I and quadrature component Q.

For example, if n=6, m=2 and u=v=2, the data rate Ra becomes 3W/K, so the data rate of this example becomes three times as fast as a conventional receiver.

Moreover, for primary modulation, not only using QPSK (m=2) but also using multilevel index by using 8PSK (m=3) or 16PSK (m=4) is possible, although the case of m=2 is taken as an example in the above embodiment.

Furthermore, for spread codes used by the present invention, a code that does not cause deterioration of error rate even under the multipath environment is preferable, because anti-multipath characteristic determines communication quality in a wireless local area communication systems such as wireless LAN. In general, for this invention, it is the same as the usual spread spectrum communication systems that it is better to use spread codes having such properties that autocorrelation value is small except for at synchronous point, mutual correlation value is small at synchronous point or in the vicinity of synchronous point and crosscorrelation value except for at synchronous point is smaller than autocorrelation value at synchronous point. However, the vicinity of synchronous point discussed here is supposed as a range that sufficiently affords to delay dispersion in room (about 100 ns).

Furthermore, another requirement such as good polar balance, namely it is premised for one-dimensional codes that respective total numbers of symbols, + and −, are +1, −1 or 0.

More, it is desirable that crosscorrelation values of spread codes and autocorrelation values except for at synchronous point are small as possible as they can, in consideration of anti-multipath characteristic. Therefore, it is possible to use two-dimensional codes consisting of complex numbers not but one-dimensional codes. Contrary to that the total number of candidates of one-dimensional spread codes is $2^k$ when code length determined by spread rate K is supposed as k, the total number of candidates of two-dimensional spread codes is more than $2^{2k}$. In addition, if using two-dimensional codes, the multiplier in the transmitter and the matched filter in the receiver must conduct complex operations. Therefore, the complexity of the configuration thereof increases.

Here, using a complex number $Ci=p-jp$ for the two-dimensional spread codes and limiting four values such as (1, 0), (0, 1), (−1, 0) and (0, −1) as the values of real part p and imaginary part q of the complex number, the spread code Ci becomes one code string taking 4 points $(1, j, -1, -j)$ on a complex plane. More, multiplication of an arbitrary complex number A and the spread code Ci, A×1 means "not rotate", A×j means "rotate counterclockwise in 90°" (replacement of in-phase components I and quadrature components Q), A×−1 means "rotate in 180°", and A×−j means "rotate clockwise in 90°" (replacement of in-phase components I and quadrature components Q).

Therefore, in this case, any complex operations at the multiplier in the transmitter and the matched filter in the receiver are not needed, so it enables the same level of complexity of the circuit configuration as that of the case using primary codes.

What is claimed is:

1. A spread spectrum modulation method comprising the steps of:
    (a) dividing a binary serial data into a first bit data and a second bit data;
    (b) primarily modulating said first bit data;
    (c) selecting a spread code corresponding to said second bit data; and
    (d) spread said primarily modulated first bit data with said selected spread code.

2. The spread spectrum modulation method of claim 1, wherein said (c) step is a step of converting said second bit data to k parallel bit data and selecting said spread code so as to correspond to said k parallel bit data.

3. The spread spectrum modulation method of claim 1, wherein said (c) step is a step of converting said second bit data to k parallel bit data and selecting said spread code so as to correspond to said k parallel bit data from among $2^k$ kinds of preset spread codes.

4. The spread spectrum modulation method of claim 1, wherein said (a) step is a step of converting said binary serial data to n parallel bit data, determining m parallel bit data in said n parallel bit data as said first bit data and (n−m) parallel bit data as said second bit data.

5. The spread spectrum modulation method of claim 4, wherein said spread code is selected from among $2^{(n-m)}$ kinds of preset spread codes.

6. The spread spectrum modulation method of claim 4, wherein said (b) step is a step of dividing said first bit data into in-phase components and quadrature components and primarily modulating both components respectively.

7. A spread spectrum modulation method comprising the steps of:
    (a) converting a binary serial data to n parallel bit data;
    (b) primarily modulating m parallel bit data in said n parallel bit data;
    (c) selecting a spread code corresponding to (n−m) parallel bit data that were not primarily modulated in said (b) step; and
    (d) spread modulating said m parallel bit data that were primarily modulated in said (b) step with said spread code selected in said (c) step.

8. The spread spectrum modulation method of claim 1, wherein said spread code is selected from among $2^{(n-m)}$ kinds of preset spread codes.

9. The spread spectrum modulation method of claim 7, wherein said (b) step is a step of dividing said m parallel bit data into in-phase components and quadrature components and primarily modulating both components respectively.

10. A spread spectrum demodulation method for use in a system for demodulating spread-modulated signals that demodulates a modulated signal by using spread spectrum modulation containing the steps of dividing a binary serial data into a first bit data and a second bit data, primarily modulating said first bit data, spreading the primarily modulated data with a spread code corresponding to said second bit data, said spread spectrum demodulation method comprising the steps of:
    (a) converting said modulated signal to a digital data;
    (b) sequentially multiplying said digital data by a plurality of spread codes, detecting a maximum value of correlation values resulting from the multiplications and specifying a spread code corresponding to said maximum value;
    (c) demodulating said first bit data using a correlation value of said maximum value;
    (d) specifying second bit data using a spread code corresponding to said maximum value; and
    (e) obtaining said binary serial data from said first bit data and said second bit data.

11. The spread spectrum demodulation system of claim 10, wherein said (b) step further comprises the steps of:
    holding said digital data in order of input;
    latching said digital data held in order of input by parallelly transmitting said digital data at a synchronous point; and
    sequentially multiplying the latched data by said plurality of spread codes.

12. The spread spectrum demodulation method of claim 10, wherein said plurality of spread codes are the same as a plurality of spread codes prepared at said spread spectrum modulation.

13. The spread spectrum demodulation method of claim 10, wherein said spread spectrum modulated signals were primarily modulated using QPSK modulation, and
    wherein in-phase components and quadrature components are processed respectively in said (b) step.

14. A spread spectrum demodulation method for use in a system for demodulating spread spectrum modulated signals that demodulates a modulated signal by using spread spectrum modulation containing the steps of converting a binary serial data to n parallel bit data, primarily modulating m parallel bit data in said n parallel bit data and spreading the primarily modulated m parallel bit data with a spread code corresponding to (n−m) parallel bit data, said method comprising the steps of:

(a) converting said modulated signal to digital data and holding the digital data bit by bit and in order of input;

(b) latching the data held in order of input by parallelly sending the data at a synchronous point and sequentially multiplying bit by bit the latched data by a plurality kinds of spread codes used at spreading;

(c) detecting a maximum value in correlation values obtained by the multiplications;

(d) determining (n−m) bit data based on a spread code corresponding to a detected maximum value and determining m bit data by demodulating a correlation value obtained by the multiplications; and (e) converting the determined (n−m) bit data and m bit data to said binary serial data.

15. The spread spectrum demodulation method of claim 14, wherein $2^{(n-m)}$ kinds of spread codes are used for said spread code in said (b) step.

16. The spread spectrum demodulation method of claim 14, wherein said (b) step is applied to in-phase components and quadrature components, respectively.

17. A spread spectrum communication method comprising the steps of:

(a) converting a binary serial data to n parallel bit data;

(b) primarily modulating m parallel bit data in said n parallel bit data;

(c) selecting a spread code corresponding to (n−m) parallel bit data that were not primarily modulated from among $2^{(n-m)}$ kinds of preset spread codes;

(d) spread modulating said m parallel bit data that were primarily modulated with the selected spread code, and transmitting modulated signals;

(e) receiving said modulated signals, converting said modulated signals to digital data and holding the data bit by bit and in order of input;

(f) latching the data held in order of input by parallelly sending the data at a synchronous point and sequentially multiplying bit by bit the latched data by said $2^{(n-m)}$ kinds of spread codes;

(g) detecting a maximum value from among correlation values obtained by the multiplications;

(h) detecting a spread code corresponding to said maximum value and specifying a spread code used for spreading;

(i) determining (n−m) bit data based on a specified spread code and demodulating m bit data based on a maximum correlation value; and (j) converting the determined (n−m) bit data and the demodulated m bit data to said binary serial data.

18. The spread spectrum communication method of claim 17, wherein said (b) step, said (e) step and said (f) step are applied respectively to in-phase components and quadrature components.

19. A spread spectrum modulator comprising:

a converting means for converting a binary serial data to n parallel bit data;

a means for primarily modulating m parallel bit data in said n parallel bit data;

a generating means for generating a spread code corresponding to (n−m) parallel bit data that were not primarily modulated; and a means for spread modulating said (n−m) parallel bit data with said spread code.

20. A spread spectrum modulator of claim 19, wherein said generating means comprises:

a means for generating $2^{(n-m)}$ kinds of spread codes, and a selecting means for selecting said spread code corresponding to said (n−m) parallel bit data from among said b $2^{(n-m)}$ kinds of spread codes.

21. The spread spectrum modulator of claim 20, wherein said converting means further comprises a means for separating said m parallel bit data into in-phase components and quadrature components.

22. A spread spectrum demodulator for spread-modulated signals that demodulates a modulated signal that were spread-spectrum-modulated through the steps of primarily modulating m bits of n bit serial data, multiplying the primarily modulated data by spread codes corresponding other (n−m) bits, said demodulator comprising:

an analog-to-digital converting means for converting said modulated signal to digital data;

a spread code generating means for sequentially outputting a plurality of spread codes during a symbol time;

an inverse spreading means for calculating correlation values by multiplying the output of said analog-to-digital converting means by said spread codes during a single symbol time;

a maximum value detecting means for detecting a maximum correlation value from among a plurality of correlation values obtained by said inverse spreading means and specifying (n−m) bit data from among spread codes corresponding to said maximum correlation value;

a demodulating means for demodulating outputs of said inverse spreading means and obtaining m bit data; and a converting means for converting m bit data demodulated with said demodulating means and (n−m) bit data specified with said maximum value detecting means to n bit serial data.

23. The spread spectrum demodulator of claim 22, wherein said inverse spreading means comprises:

a shift register for holding outputs of said analog-to-digital converting means, for said single symbol time and in order of input;

a latch circuit for latching the data held in order of input with said shift register by parallelly sending the data at a synchronous point; and a multiplier for multiplying, during said single symbol time, the data latched with said latch circuit by a plurality of spread codes.

24. The spread spectrum demodulator of claim 22, wherein said spread code generating means comprises $2^{(n-m)}$ spread code generators and a switching means for switching said $2^{(n-m)}$ spread code generators for each one chip period.

25. The spread spectrum demodulator of claim 22, that demodulates spread spectrum modulated signals for which QPSK modulation systems are used for primarily modulation, comprising:

a first inverse spreading means for calculating in-phase components;

a second inverse spreading means for calculating quadrature components; and a means for calculating a vector sum of an output of said first inverse spreading means and an output of said second inverse spreading means.

26. The spread spectrum demodulator of claim 25, wherein each of said first inverse spreading means and said second inverse spreading means comprises:

a shift register for holding outputs of said analog-to-digital convertor for said single symbol time and in order of input;

a latch circuit for latching the data held in order of input with said shift register by parallelly sending the data at a synchronous point; and a multiplier for multiplying, during said single symbol time, the data latched with said latch circuit by a plurality of spread codes.

27. A spread spectrum modulation system comprising:

means for dividing a binary serial data into a first bit data and a second bit data;

means for primarily modulating said first bit data;

means for selecting a spread code corresponding to said second bit data; and means for spread modulating said primarily modulated first bit data with said selected spread code.

28. The spread spectrum modulation system of claim 27, wherein said means for selecting converts said second bit data to k parallel bit data and selects said spread code so as to correspond to said k parallel bit data.

29. The spread spectrum modulation system of claim 27, wherein said means for selecting converts said second bit data to k parallel bit data and selects said spread code so as to correspond to said k parallel bit data from among $2^k$ kinds of preset spread codes.

30. The spread spectrum modulation system of claim 27, wherein said means for dividing converts said binary serial data to n parallel bit data, and determines m parallel bit data in said n parallel bit data to be said first bit data and (n–m) parallel bit data to be said second bit data.

31. The spread spectrum modulation system of claim 30, wherein said spread code is selected from among $2^{(n-m)}$ kinds of preset spread codes.

32. The spread spectrum modulation system of claim 30, wherein said means for primarily modulating divides said first bit data into in-phase components and quadrature components and primarily modulating both components respectively.

33. A spread spectrum modulation system comprising:

means for converting a binary serial data to n parallel bit data;

means for primarily modulating m parallel bit data in said n parallel bit data;

means for selecting a spread code corresponding to (n–m) parallel bit data that were not primarily modulated by said means for primarily modulating; and means for spread modulating said m parallel bit data that were primarily modulated, by said means for primarily modulating, with said spread code selected by said means for selecting.

34. The spread spectrum modulation system of claim 27, wherein said spread code is selected from among $2^{(n-m)}$ kinds of preset spread codes.

35. The spread spectrum modulation system of claim 33, wherein said means for primarily modulating divides said m parallel bit data into in-phase components and quadrature components and primarily modulating both components respectively.

36. A spread spectrum demodulation system for demodulating spread-modulated signals that demodulates a modulated signal by using spread spectrum modulation containing the steps of dividing a binary serial data into a first bit data and a second bit data, primarily modulating said first bit data, spreading the primarily modulated data with a spread code corresponding to said second bit data, said spread spectrum demodulation system comprising:

(a) means for converting said modulated signal to a digital data;

(b) means for sequentially multiplying said digital data by a plurality of spread codes, detecting a maximum value of correlation values resulting from the multiplications and specifying a spread code corresponding to said maximum value;

(c) means for demodulating said first bit data using a correlation value of said maximum value;

(d) means for specifying second bit data using a spread code corresponding to said maximum value; and (e) means for obtaining said binary serial data from said first bit data and said second bit data.

37. The spread spectrum demodulation system of claim 36, wherein said means for sequentially multiplying comprises:

means for holding said digital data in order of input;

means for latching said digital data held in order of input by parallelly transmitting the digital data at a synchronous point; and means for sequentially multiplying the latched data by said plurality of spread codes.

38. The spread spectrum demodulation system of claim 36, wherein said plurality of spread codes are the same as a plurality of spread codes prepared at said spread spectrum modulation.

39. The spread spectrum demodulation system of claim 10, wherein said spread spectrum modulated signals were modulated using QPSK modulation, and wherein in-phase components and quadrature components are processed respectively in said (b) step.

40. A spread spectrum demodulation system for demodulating spread spectrum modulated signals that demodulates a modulated signal by using spread spectrum modulation containing the steps of converting a binary serial data to n parallel bit data, primarily modulating m parallel bit data in said n parallel bit data and spreading the primarily modulated m parallel bit data with a spread code corresponding to (n–m) parallel bit data, said system comprising:

(a) means for converting said modulated signal to digital data and holding the digital data bit by bit and in order of input;

(b) means for latching the data held in order of input by parallelly sending the data at a synchronous point, and means for sequentially multiplying bit by bit the latched data by a plurality kinds of spread codes used at spreading;

(c) means for detecting a maximum value in correlation values obtained by the multiplications;

(d) means for determining (n–m) bit data based on a spread code corresponding to a detected maximum value and determining m bit data by demodulating a correlation value obtained by the multiplications; and (e) means for converting the determined (n–m) bit data and m bit data to said binary serial data.

41. The spread spectrum demodulation system of claim 40, wherein $2^{(n-m)}$ kinds of spread codes are used for said spread code in said (b) step.

42. The spread spectrum demodulation system of claim 40, wherein both in-phase components and quadrature components are processed by said means for latching and means for sequentially multiplying.

43. A spread spectrum communication system comprising:

(a) means for converting a binary serial data to n parallel bit data;

(b) means for primarily modulating m parallel bit data in said n parallel bit data;

(c) means for selecting a spread code corresponding to (n–m) parallel bit data that were not primarily modulated from among 2 kinds of preset spread codes;

(d) means for spread modulating said m parallel bit data that were primarily modulated with the selected spread code, and transmitting modulated signals;

(e) means for receiving said modulated signals, converting said modulated signals to digital data and holding the data bit by bit and in order of input;

(f) means for latching the data held in order of input by parallelly sending the data at a synchronous point and sequentially multiplying bit by bit the latched data by said $2^{(n-m)}$ kinds of spread codes;

(g) means for detecting a maximum value from among correlation values obtained by the multiplications;

(h) means for detecting a spread code corresponding to said maximum value and specifying a spread code used for spreading;

(i) means for determining (n–m) bit data based on a specified spread code and demodulating m bit data based on a maximum correlation value; and (j) means for converting the determined (n–m) bit data and the demodulated m bit data to said binary serial data.

44. The spread spectrum communication system of claim 43, wherein said means for primarily modulating, means for receiving, and means for latching are applied respectively to in-phase components and quadrature components.

45. A spread spectrum modulation method comprising the steps of:

converting a binary serial, data to n parallel bit data;

primarily modulating m parallel bit data in said n parallel bit data;

generating a spread code corresponding to (n–m) parallel bit data that were not primarily modulated; and spread modulating said (n–m) parallel bit data with said spread code.

46. A spread spectrum modulation method of claim 45, wherein said generating step comprises:

generating $2^{(n-m)}$ kinds of spread codes, and selecting said spread code corresponding to said (n–m) parallel bit data from among said $2^{(n-m)}$ kinds of spread codes.

47. The spread spectrum modulation method of claim 46, wherein said converting step further comprises the step of separating said m parallel bit data into in-phase components and quadrature components.

48. A spread spectrum demodulation method for use in a system for spread-modulated signals that demodulates a modulated signal that were spread-spectrum-modulated through the steps of primarily modulating m bits of n bit serial data, multiplying the primarily modulated data by spread codes corresponding other (n–m) bits, said method comprising the steps of:

converting said analog modulated signal to digital data;

generating and sequentially outputting a plurality of spread codes during a symbol time;

calculating correlation values by multiplying the output of said analog-to-digital converting means by said spread codes during said single symbol time;

detecting a maximum correlation value from among a plurality of correlation values obtained by said inverse spreading means and specifying (n–m) bit data from among spread codes corresponding to said maximum correlation value;

demodulating outputs of said inverse spreading means and obtaining m bit data; and converting m bit data demodulated with said demodulating means and (n–m) bit data specified with said maximum value detecting means to n bit serial data.

49. The spread spectrum demodulation method of claim 48, wherein said calculating step comprises the steps of:

holding outputs of said analog-to-digital converting means, for said single symbol time and in order of input;

latching the data held in order of input with said shift register by parallel sending the data at a synchronous point; and multiplying, during said single symbol time, the data latched with said latch circuit by a plurality of spread codes.

50. The spread spectrum demodulation method of claim 48, wherein said spread code generating step comprises switching $2^{(n-m)}$ spread code generators for each one chip period.

51. The spread spectrum demodulation method of claim 48, that demodulates spread spectrum modulated signals for which QPSK modulation systems are used for primarily modulation, comprising the steps of:

calculating in-phase components;

calculating quadrature components; and calculating a vector sum of said in-phase components and said quadrature components.

52. The spread spectrum demodulator of claim 51, wherein said steps of calculating in-phase components and calculating quadrature components each comprise the steps of:

holding outputs of said analog-to-digital convertor for said single symbol time and in order of input;

latching the data held in order of input with said shift register by parallel sending the data at a synchronous point; and multiplying, during said single symbol time, the data latched with said latch circuit by a plurality of spread codes.

\* \* \* \* \*